(12) United States Patent
Ernst et al.

(10) Patent No.: US 6,312,489 B1
(45) Date of Patent: Nov. 6, 2001

(54) FILTER ELEMENT FOR AN AIR FILTER AND A METHOD FOR THE PRODUCTION THEREOF

(75) Inventors: Volker Ernst, Sachsenheim; Arthur Klotz, Remseck; Bruno Sommer, Ludwigsburg, all of (DE)

(73) Assignee: Filterwerk Mann & Hummel GmbH (DE)

( * ) Notice: Subject to any disclaimer, the term of this patent is extended or adjusted under 35 U.S.C. 154(b) by 0 days.

(21) Appl. No.: 09/403,259
(22) PCT Filed: Apr. 15, 1998
(86) PCT No.: PCT/EP98/01541
§ 371 Date: Dec. 30, 1999
§ 102(e) Date: Dec. 30, 1999
(87) PCT Pub. No.: WO98/47601
PCT Pub. Date: Oct. 29, 1998

(30) Foreign Application Priority Data

Apr. 18, 1997 (DE) .............................. 197 16 161

(51) Int. Cl.$^7$ .................................. B01D 45/00
(52) U.S. Cl. ............... 55/385.3; 55/479; 55/482; 55/486; 55/502; 55/529
(58) Field of Search .................. 55/385.3, 478, 55/479, 482, 486, 500, 502, 529

(56) References Cited

U.S. PATENT DOCUMENTS

| 4,200,444 | * | 4/1980 | Witchell | 55/529 |
| 4,640,779 | * | 2/1987 | Taki et al. | 55/529 |
| 5,968,215 | * | 10/1999 | Webb | 55/529 |
| 6,059,851 | * | 5/2000 | DePietro, III et al. | 55/529 |

FOREIGN PATENT DOCUMENTS

| 4218396 A1 | * | 12/1993 | (DE) . |
| 4223723A1 | * | 1/1994 | (DE) . |
| 0058994 A1 | * | 9/1982 | (EP) . |
| 0692294 A1 | * | 1/1996 | (EP) . |
| 2098317 A | * | 4/1982 | (GB) . |

* cited by examiner

Primary Examiner—David A. Simmons
Assistant Examiner—Minh-Chau T. Pham

(57) ABSTRACT

A filter element for an air filter, including a filter insert (2; 8; 10) and a seal (6) extending around the outer edges of the filter insert on the flat side thereof; the filter insert being folded in a zig-zag or pleated form and being composed of filter paper or filter fabric. The filter element (1; 7; 9; 10) rests against parts of a filter housing through the seal (6). The folded filter insert has a contour on one side which deviates extensively from a plane, at least in certain predetermined areas, thus creating a continuous zig-zag fold.

10 Claims, 2 Drawing Sheets

FILTER ELEMENT FOR AN AIR FILTER AND A METHOD FOR THE PRODUCTION THEREOF

BACKGROUND OF THE INVENTION

The invention relates to a filter element for an air filter with a folded filter insert, in particular for the filtering of the intake air of an internal combustion engine.

It is known from DE 42 18 396 A1 that filter elements, particularly when used in the internal combustion engines of trucks and building machinery, are produced with a relatively large filter surface. These filter elements are provided on one side with a seal which runs at least around the edge in order to seal the unfiltered air side from the filtered air side.

The known filter element can be structured additionally such that particular geometries in the filter housing or on the bordering aggregates are accommodated by combining individual filter elements with folds of differing heights. The individual filter elements are then each produced separately and are joined to each other with additional connection links which also function as hinges.

SUMMARY OF THE INVENTION

The object of the invention is to develop a filter element of the kind described in the introduction such that a contour of the folded filter insert, adjustable for optimization, can be achieved simply.

ADVANTAGES OF THE INVENTION

The folded filter insert of the filter element according to the invention advantageously exhibits on its one side a contour which is two-dimensional and at least partially deviates from a plane and additionally exhibits a continuous zigzag folding. According to the invention, in order to optimize the functioning of the filter by better utilizing the space in the region of this side of the filter insert, the filter element can easily be adapted to fit complex structures in the intake region of an internal combustion engine. Due to the good layout of the filter element with respect to the geometry in the intake path, the invention also helps improve the flow pattern on this air intake side of the filter element.

For example, also slopes, pointed or curved contours can be provided on the appropriate side of the filter insert, where, due to the continuous zigzag folds, a largely even functioning of the filter is ensured over the entire filter surface. On the other side of the filter element, a uniformly flat surface is present there without connection links since the regions of different fold height transition continuously into one another.

In a simple method for producing the filter element according to the invention, folded regions of the filter insert with differing fold heights are prefabricated and, during assembly of the filter element, are glued together, stamped together or firmly fixed together in some other way with the fold that adjoins each one.

Separately, it is known from DE 42 23 723 C2 that, in order to produce the zigzag-shaped filter insert, webs with filter paper from a supply roll are unrolled and are imprinted in preparation for folding. These imprinted filter paper webs are then folded in a device at the imprints. In order to produce a filter element in accordance with the invention, the distances between the imprints are varied in a simple way such that different fold heights are achieved and therefore on one side of the folded web a correspondingly changed contour is created.

Other advantageous exemplary embodiments are described hereinafter.

BRIEF DESCRIPTION OF THE DRAWINGS

Exemplary embodiments of the inventive filter element with a folded filter insert are explained using the drawing. Shown are.

DETAILED DESCRIPTION OF PREFERRED EMBODIMENTS

Figure 1:
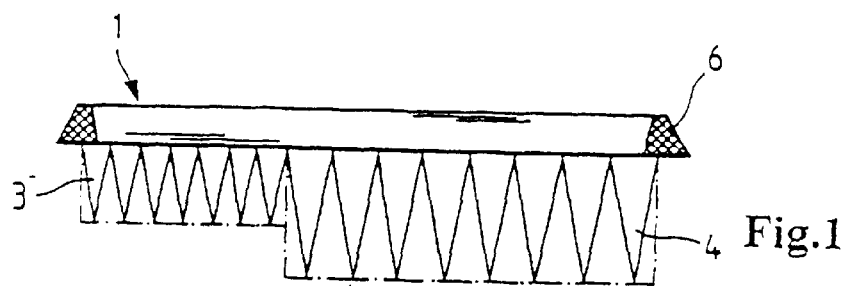
FIG. 1 a first exemplary embodiment with a contour of different levels on one side of the filter insert.

Shown in FIG. 1 is a cross section of a filter element 1 with a zigzag-structured filter insert 2, which on its underside has a folded region 3 with a relatively low fold height and a folded region 4 with a relatively high fold height. A different view of the filter element 1 can be seen in FIG. 2, in which on the right side there is a folded region 5 likewise with a low fold height. These regions can be arranged in different positions in additional exemplary embodiments, not pictured here, depending on the situation of their use.

The filter element 1 has, running around its upper side, a seal 6 with which the filter element 1 can be tightly fit into in a filter housing, not pictured here, for an air filter in the air intake path of an internal combustion engine. The unfiltered air which is sucked in flows in accordance with an arrow 11 through the filter element 1 from the contour adapted side to the other side, pictured here above, whereby optimal flow patterns occur here due to the contour of the one side of filter insert 2, adapted to the geometry of the intake path.

Figure 2:
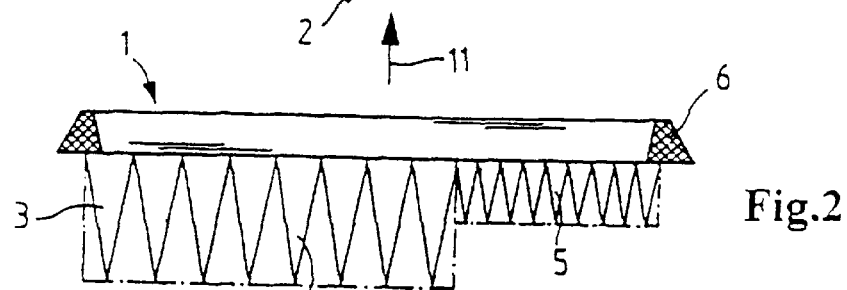
FIG. 2 another view of the exemplary embodiment according to FIG. 1.

The production of the filter insert 2 in accordance with FIGS. 1 and 2 can occur with the individual regions 3 and 4 being produced separately and then the respective adjoining folds of folded regions 3, 4, 5 being attached to each other.

Figure 3:
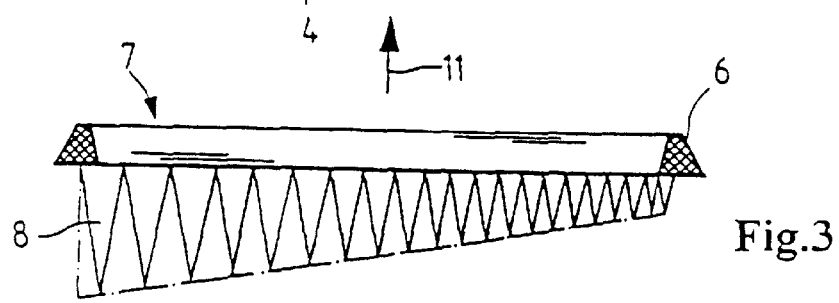
FIG. 3 a second exemplary embodiment with a slope contour on one side of the filter insert.

For an exemplary embodiment in accordance with FIG. 3, a filter element 7 is provided with a filter insert 8 which runs in a slope on the contour adapted side. The fold height, changing here along the surface of this side of filter insert 8, can be achieved by changing the distance between folds when folding the paper webs or fabric webs, based on the (DE 42 23 723 C2) folding process, already assumed known in the introduction to the specification.

Figure 4:
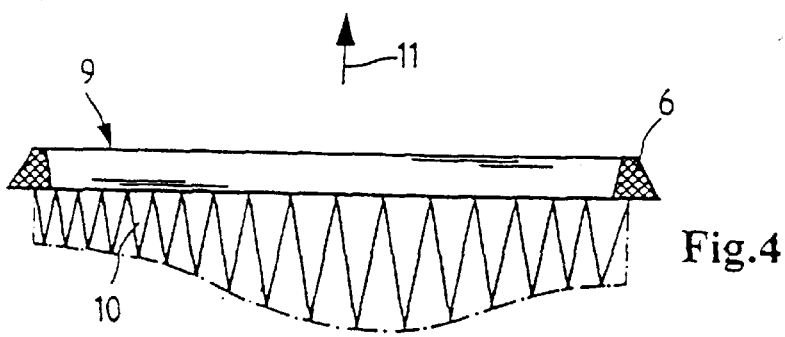
FIG. 4 a third exemplary embodiment with a curved contour on one side of the filter insert.

In order to have an optimum adaptation of the contour for curved geometries in the intake path, one side of a filter insert 10 is also correspondingly curved to fit in the exemplary embodiment of a filter element 9 in accordance with FIG. 4. This changing curve, for example, can also be produced by correspondingly directing a change in the distance between folds or between the imprinting in the folding process.

Figure 5:
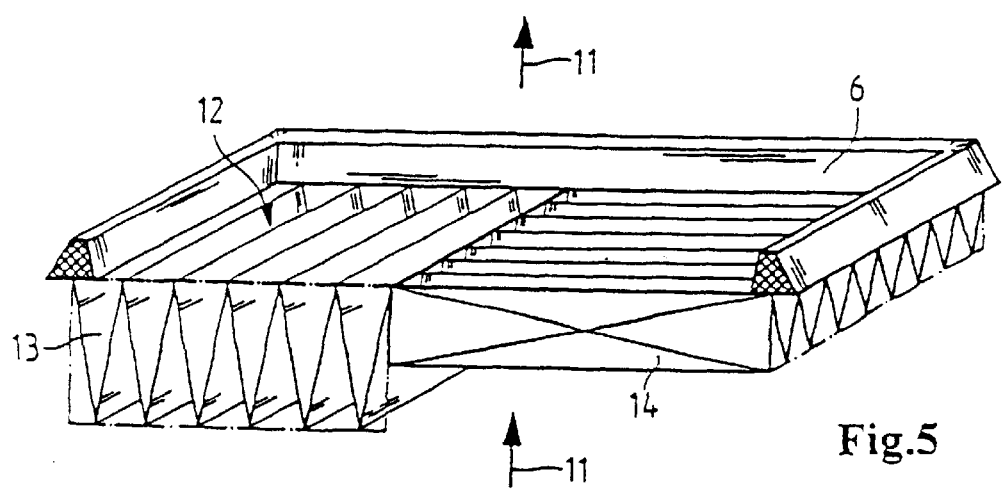
FIG. 5 a fourth exemplary embodiment of a filter element with areas of different fold direction for the filter insert regions.

In the exemplary embodiment in accordance with FIG. 5, a filter element 12 is provided with two folded regions 13 and 14 which each fold in different directions.

Figure 6:
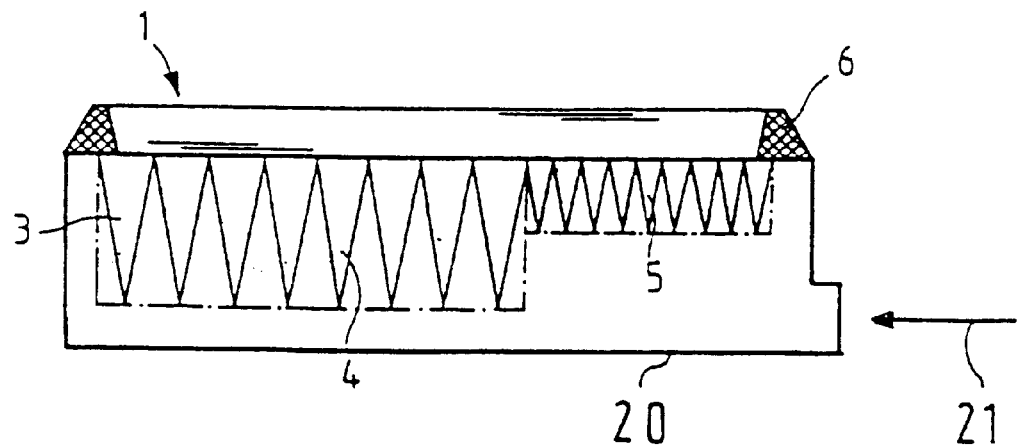
FIG. 6 a representation of the exemplary embodiment in accordance with FIG. 2 with parts of a housing and FIG. 7 a representation of the exemplary embodiment in accordance with FIG. 3 with part of a housing.
Figure 7:
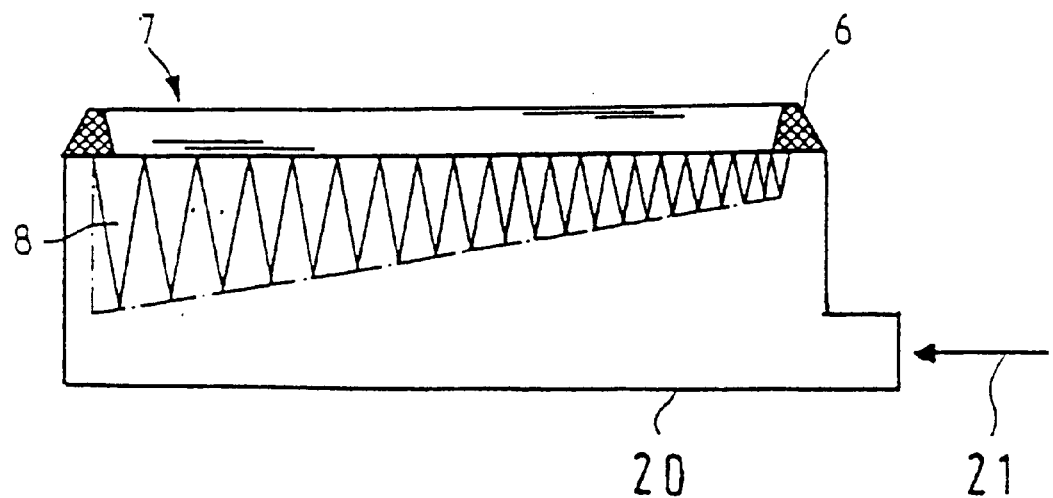

FIG. 6 shows the filter element in accordance with FIG. 2, having a housing 20, in which the unfiltered air enters on the side according to arrow 21. Due to this, an even volume flow can be achieved since, because of the relatively large filter surface in the back region 4, a relatively large volume flow can occur here in spite of the distance from the entrance point. This effect can be seen with equal clarity in FIG. 7, since here with the filter surface becoming continuously smaller in accordance with FIG. 3, the volume flow can be reduced in the front area at the entrance point and thus be evened out.

What is claimed is:

1. A filter element for an air filter comprising:

a zigzag-shaped folded filter insert made of a web of filter material, the filter insert comprising a first folded region extending over a first area and a second folded region attached to the first folded region and extending over a second area;

the first and second folded regions of the filter insert having a flat first face with a seal extending around outer edges of said flat face which is arranged to seal the first and second folded regions, said seal contacting parts of a filter housing when said filter insert is inserted therein;

the first and second folded regions each comprising a different height over their respective first and second areas, each height being defined by continuous zigzag foldings of the filter material forming pleats, the different heights of the first and second folded regions defining a second face of the folded filter insert which exhibits a surface contour which deviates from a plane;

wherein the pleats of the first folded region extend parallel to the pleats of the second folded region.

2. A filter element according to claim 1, wherein said folded filter insert lies on one side on a component having a non-planar uneven contour; said folded filter insert having a corresponding contour on said one side which likewise deviates from a plane.

3. A filter element according to claim 1, wherein on its unfiltered air side the folded filter insert exhibits a fold height which can be changed such that the volume flow is even over the total surface of the filter insert.

4. A filter element according to claim 1, wherein at a point where unfiltered air enters the filter, the folded filter insert exhibits the relatively smallest filter surface due to a relatively low fold height, and wherein the fold height increases in a direction away from the entrance point.

5. A filter element according to claim 4, wherein the fold height increases non-uniformly.

6. A filter element according to claim 1, wherein the first and second folded regions of the folded filter insert are affixed together at adjacent foldings.

7. A filter element according to claim 6, wherein said first and second folded regions are affixed by gluing, pressing, or stamping them together.

8. A filter element according to claim 1, wherein said filter insert has a non-planar contour on one side thereof which is determined by the geometry of an adjacent member on said one side after the filter element is installed in a filter housing.

9. A filter element according to claim 8, wherein said filter housing is a component of an air intake path of an internal combustion engine.

10. A process for producing the filter element of claim 1, comprising the steps of:

imprinting webs of the filter material in preparation for folding at predetermined distances which differ in part from each other;

folding the imprinted webs along the imprints;

separating the folded filter material webs from a supply web;

fixing the separated webs in position to form the filter insert, and providing the filter insert with a surrounding seal.

* * * * *